United States Patent Office 3,169,877
Patented Feb. 16, 1965

3,169,877
MORTAR COMPOSITIONS
John A. Bartoli, 2846 Lucas, and Julius J. Bartoli, 5427 Red Field, both of Dallas, Tex.
No Drawing. Filed Jan. 16, 1961, Ser. No. 82,728
2 Claims. (Cl. 106—93)

This invention relates to mortar compositions, and more particularly to cement mortar compositions.

The basic conventional mortars for setting tile, laying up masonry, plastering, and the like, consist of Portland cement, lime, and sand to which water is added to make a paste of suitable consistency. To these conventional mortars are generally added a proportion of methyl cellulose which provides the composition with many characteristics particularly desirable in applications of the mortar to dry, porous objects. In these compositions, the methyl cellulose increases the viscosity of the liquid phase of the compositions to retard the flow of water from the slurry to the applied object and also forms a film at the exposed surface which decreases the rate of evaporation of the water from the slurry to the atmosphere. The enhanced water-retentive property of these compositions as caused by the film-forming and viscosity characteristic of the methyl cellulose makes them more adaptable for use in dry-setting conditions which would otherwise require the maintenance of very wet conditions. Such very wet conditions are oftentimes impractical or impossible to attain and generally unsatisfactory when the compositions are applied to such substrates as gypsum wallboard or plaster. Heretofore, the highest viscosity grade of methyl cellulose in mortar compositions has been generally limited to approximately 7,000 centipoise for various reasons among which were the beliefs that methyl cellulose of a higher viscosity grade tends to unduly extend the curing time of such compositions or prevents the attainment of a proper consistency of the composition without requiring so large a proportion of water as would cause excessive and undesirable shrinkage.

Such mortar compositions including relatively low viscosity grade methyl cellulose, however, have not proved satisfactory for applications to hot, dry surfaces or in applications to exposed surfaces in hot, dry windy weather conditions. Under such conditions, the conventional cement mortars and the modified low viscosity methyl cellulose types of mortars lose their viscosity and water-retentive properties so that the curing action is incomplete and the mortar forms a soft and chalky bond. The low viscosity methyl cellulose types of mortars are generally satisfactory at temperatures up to 100 degrees F. but in the range from 100 to 200 degrees F. and particularly at temperatures approaching 200 degrees F. form weak bonds which tend to crumble on contact. This is particularly true if the application is a thin coat.

It often becomes necessary in construction work to finish an area with cement, plaster, ceramic tile, or terrazo where nearby steam pipes, a boiler, or the like, have raised the temperature to where such work could not be done without closing down the steam or at least to where such work would only result in an inferior job because of the rapid evaporation of water from the mixture induced by the excessive heat. This same problem is encountered where exposed surfaces of these finishes are to be applied in hot, dry windy weather and in the setting of hot stones or bricks or in the filling of voids and cracks in hot cement slabs.

Accordingly, one object of this invention is to provide a new and improved mortar composition.

Another object is to provide an improved mortar composition having excellent adhesive qualities over a broad range of temperatures and particularly at high temperatures.

Still another object is to provide an improved mortar composition which will set extremely hard to a variety of surfaces including porous dry surfaces under a broad range of temperature conditions, and particularly at high temperatures.

A further object is to provide an improved mortar composition which may be applied to surfaces of up to 200° Fahrenheit temperature and which will set hard at such temperatures.

A still further object is to provide an improved mortar composition which will mix well with either hot or cold water over a temperature range of near freezing to near boiling, will have proper working consistency, good adhesive properties, proper hardness after setting, will not require too long a time to harden, and will not exhibit undue shrinkage in the hardened or set condition.

A still further object is to provide a mortar composition which will mix readily with water without the need of special treatment and which may be added to plain cement directly on the job to form a practical cement mortar composition.

Additional objects and advantages of the invention will be readily apparent upon reference to the following description and appended claims.

The general rule for using methyl cellulose in cement mortar compositions is to decrease the amount of the methyl cellulose as the viscosity index thereof increases. Such mortar compositions ordinarily include Portland cement to which may be added sand or marble dust (powdered limestone) or both sand and powdered limestone. Theoretically, it would require ½ as much methyl cellulose of 7,000 centipoise viscosity grade as it would methyl cellulose of 400 centipoise viscosity grade and very little of methyl cellulose of 15,000 centipoise viscosity to get the same results. We have discovered through experimentation, and contrary to the general rule and belief, a very satisfactory mortar composition including a given amount of methyl cellulose of 10,000 to 15,000 centipoise viscosity may be provided which has the same water retention properties at room temperatures as a cement mortar composition which includes even slightly less than the same amount of methyl cellulose of 100 to 400 centipoise viscosity. Such a cement mortar composition may include methyl cellulose of 10,000 to 15,000 centipoise viscosity having approximately 8/10, by weight, as much marble dust as cement. Also, in the same composition with the marble dust eliminated therefrom, by reducing the amount of methyl cellulose of 10,000 to 15,000 centipoise viscosity by substantially one-half the same retarding of set and water retention characteristics is obtained. The use of methyl cellulose of such high viscosities provides results substantially different than the use of methyl cellulose of lower viscosities as the addition of marble dust increases the water retention characteristics of mortar compositions employing methyl cellulose of such higher viscosities.

The following are specific examples of compositions within the scope of the invention, each of which is adapted to form a mortar when mixed with water of an amount which by weight is 50 to 75% of the weight of the dry ingredients exclusive of the sand which is of a temperature in the range of 33 to 180 degrees Fahrenheit:

(In the following examples, percentages are based on the total weight of the dry ingredients.)

*Example 1*

| | Percent |
|---|---|
| Marble dust (powdered limestone) | 1.0 |
| Portland cement | 98.7 |
| Methyl cellulose (15,000 centipoise viscosity) | 0.3 |

Example 2

| | Percent |
|---|---|
| Sand | 49.7 |
| Portland cement | 50.0 |
| Methyl cellulose (10,000 centipoise viscosity) | 0.3 |

Example 3

| | |
|---|---|
| Powdered limestone | 45.0 |
| Portland cement | 50.0 |
| Methyl cellulose (15,000 centipoise) | 5.0 |

Example 4

| | |
|---|---|
| Portland cement | 95.0 |
| Methyl cellulose (15,000 centipoise) | 5.0 |

Example 5

| | |
|---|---|
| Portland cement | 99.7 |
| Methyl cellulose (15,000 centipoise) | 0.3 |

Example 6

| | Lbs. |
|---|---|
| Portland cement | 20.0 |
| Methyl cellulose (10,000 centipoise) | 0.1 |

Example 7

| | |
|---|---|
| Powdered limestone | 5.0 |
| Portland cement | 23.0 |
| Methyl cellulose (12,000 centipoise) | 0.8 |

In the following examples within the scope of the invention, the compositions are adapted to form a suitable mortar when mixed with water of an amount which by weight is 40 to 80% of the weight of the dry ingredients exclusive of the sand and which is of a temperature in the range of 33 to 185 degrees Fahrenheit. The proportions are based on the total volume of the dry ingredients.

Example 8

| | Parts |
|---|---|
| Sand | 1 |
| Portland cement | 79 |
| Methyl cellulose (15,000 centipoise) | 20 |

Example 9

| | |
|---|---|
| Sand | 1 |
| Portland cement | 97.8 |
| Methyl cellulose (10,000 centipoise) | 1.2 |

Example 10

| | |
|---|---|
| Powdered limestone | 40 |
| Portland cement | 40 |
| Methyl cellulose (15,000 centipoise) | 20 |

Among the advantageous characteristics found in a cement mortar composition including high viscosity (10,000 to 15,000 centipoise) methyl cellulose, as has been described, are excellent adhesive qualities at all temperatures, and particularly at high temperatures. It is an extremely hard setting cement mortar which works excellently at normal temperatures and superior to conventional compositions at high and near freezing temperatures. When applied to hot surfaces, it forms a thick leather-like film to seal the water within the hot mortar slurry and retard its evaporation, thereby causing a hard set and excellent adhesion to take place. It mixes well with either hot or near freezing water although the film formation is not as heavy at these temperatures. It offers a high resistance to tiles slipping from gravity when used as a setting cement for tiles, yet gives a longer period of adjustment time for such tiles over conventional mortars and lower viscosity methyl cellulose types of mortars.

Because of these characteristics, the mortar has extremely high bonding power to hot, dry porous masonry or concrete, and even to hot gypsum wallboard. It has high resistance to cracking when applied to hot surfaces and is ideal for rubbing thin coats on concrete, or refinishing, or renewing old concrete since it is generally unaffected by hot, windy weather. When used in setting tile to hot surfaces, it allows a desirable period of adjustment time for aligning the individual tiles, and the like, whereas the conventional mortars and low viscosity methyl cellulose types tend to hold tiles firmly almost instantaneously when set in place with little time allowed for adjustment.

Through further experimentation, it was found that in lieu of the methyl cellulose of 10,000 to 15,000 centipoise viscosity, the use in the composition of medium to high viscosity hydroxy ethyl cellulose (WP 250 to QP 4400) or high viscosity waterproof casein glue works virtually the same and produces the same results so as to be substantial equivalents which may be substituted therefor. However, the hydroxy ethyl cellulose mixes readily with water so that the liquid mixture phase of the composition may be accomplished on the job whereas conventional mixtures with methyl cellulose need premixing dry ingredients for dissolving the methyl cellulose in water. By the addition of QP 4400 hydroxy ethyl cellulose to methyl cellulose compositions, it has been found that mixture with water can also be readily achieved.

The following are specific examples of compositions within the scope of the invention, each comprising hydroxy ethyl cellulose or waterprof casein glue:

(In Examples 11 through 16 the ingredients are adapted to be mixed with an amount of water based on the weight of dry ingredients exclusive of sand which is 50 to 75% of the weight of the cement, limestone, and cellulose and is of a temperature in the range of 33 to 180 degrees Fahrenheit.)

Example 11

| | Percent |
|---|---|
| Sand | 45.0 |
| Portland cement | 50.0 |
| Hydroxy ethyl cellulose (WP 300) | 5.0 |

Example 12

| | Percent |
|---|---|
| Sand | 1.0 |
| Portland cement | 98.7 |
| Hydroxy ethyl cellulose (QP 4400) | 0.3 |

Example 13

| | Percent |
|---|---|
| Powdered limestone | 49.7 |
| Portland cement | 50.0 |
| Hydroxy ethyl cellulose (QP 4400) | 0.3 |

Example 14

| | Lbs. |
|---|---|
| Portland cement | 20.0 |
| Hydroxy ethyl cellulose (WP 300) | 0.7 |

Example 15

| | Lbs. |
|---|---|
| Portland cement | 20.0 |
| Hydroxy ethyl cellulose (QP 4400) | 0.7 |

Example 16

| | Lbs. |
|---|---|
| Portland cement | 23.0 |
| Fine sand | 10.0 |
| Hydroxy ethyl cellulose (WP 300) | 1.0 |

(In the following examples, 17 through 19, the specific composition is adapted to mix with water of a temperature in the range of 33 to 185 degrees Fahrenheit and of an amount which is by weight 40 to 80% of the total weight of the cement and cellulose. The proportions are based on the total volume of the dry ingredients).

Example 17

| | Parts |
|---|---|
| Powdered limestone | 50.0 |
| Portland cement | 48.8 |
| Hydroxy ethyl cellulose (WP 300) | 1.2 |

*Example 18*

| | Parts |
|---|---|
| Sand | 1.0 |
| Portland cement | 79.0 |
| Waterproof casein glue | 20.0 |

*Example 19*

| | Parts |
|---|---|
| Portland cement | 80.0 |
| Waterproof casein glue | 20.0 |

The foregoing description of the invention is explanatory only, and variations in the specific compositions illustrated may be made by those skilled in the art, within the scope of the appended claims, without departing from the spirit of the invention.

What is claimed and desired to be secured by Letters Patent is:

1. A dry mortar composition which consists essentially of, by weight, 50 to 98.7% Portland cement, 1 to 49.7% of at least one substance selected from the group consisting of sand and powdered limestone, and 0.3 to 5% methyl cellulose of 10,000 to 15,000 centipoise viscosity grade, said composition being adapted to form a mortar comprising water in an amount which is, by weight, 50 to 75% of the weight of the dry ingredients exclusive of sand.

2. A mortar composition which consists essentially of, by weight, 50 to 98.7% Portland cement, 1 to 49.7% of at least one substance selected from the group consisting of sand and powdered limestone, 0.3 to 5% of methyl cellulose of 10,000 to 15,000 centipoise viscosity grade, said composition being adapted to form a mortar, and water in the amount of 50 to 75% of the weight of the dry ingredients exclusive of sand, said water having a temperature in the range of 33 to 180 degrees Fahrenheit.

References Cited by the Examiner

UNITED STATES PATENTS

| | | | |
|---|---|---|---|
| 1,970,921 | 8/34 | Schneider | 106—91 |
| 2,549,507 | 4/51 | Morgan et al. | 166—31 |
| 2,580,565 | 1/52 | Ludwig | 106—93 |
| 2,629,667 | 2/53 | Kaveler | 106—93 |
| 2,934,932 | 5/60 | Wagner | 106—93 X |

FOREIGN PATENTS

| | | |
|---|---|---|
| 620,500 | 3/49 | Great Britain. |

TOBIAS E. LEVOW, *Primary Examiner.*

JOHN R. SPECK, *Examiner.*